ations on this page.

United States Patent
Dehu et al.

(10) Patent No.: US 7,007,454 B2
(45) Date of Patent: Mar. 7, 2006

(54) LOCKING SYSTEM ON A CASCADE THRUST REVERSER

(75) Inventors: Michel Philippe Dehu, Tournefeuille (FR); Xavier Raymond Yves Lore, Beuzeville la Grenier (FR)

(73) Assignee: Hurel Hispano, Gronfreville l'Orcer (FR)

( * ) Notice: Subject to any disclaimer, the term of this patent is extended or adjusted under 35 U.S.C. 154(b) by 37 days.

(21) Appl. No.: 10/489,675

(22) PCT Filed: Sep. 26, 2002

(86) PCT No.: PCT/FR02/03278

§ 371 (c)(1),
(2), (4) Date: Apr. 23, 2004

(87) PCT Pub. No.: WO03/027474

PCT Pub. Date: Apr. 3, 2003

(65) Prior Publication Data

US 2004/0231317 A1 Nov. 25, 2004

(30) Foreign Application Priority Data

Sep. 27, 2001 (FR) .................................. 01 12405

(51) Int. Cl.
*F02K 3/02* (2006.01)

(52) U.S. Cl. ............................. 60/226.2; 239/265.29; 60/230

(58) Field of Classification Search ............... 60/226.1, 60/226.2, 230, 228, 262; 239/265.29, 265.33, 239/265.37
See application file for complete search history.

(56) References Cited

U.S. PATENT DOCUMENTS

| | | | | |
|---|---|---|---|---|
| 3,024,603 | A | * | 3/1962 | Tschudy ................ 239/265.29 |
| 3,040,524 | A | * | 6/1962 | Kurti .......................... 60/226.2 |
| 3,262,269 | A | * | 7/1966 | Kutney et al. ............. 60/226.2 |
| 3,500,644 | A | * | 3/1970 | Felix et al. .................... 60/229 |
| 3,599,432 | A | * | 8/1971 | Ellis .......................... 60/226.1 |
| 3,941,313 | A | * | 3/1976 | Jumelle ................. 239/265.29 |
| 3,981,451 | A | * | 9/1976 | Prior et al. ............ 239/265.31 |
| 4,177,639 | A | * | 12/1979 | Taylor ...................... 60/226.2 |
| 4,373,328 | A | * | 2/1983 | Jones ........................ 60/226.2 |
| 4,442,987 | A | * | 4/1984 | Legrand et al. ......... 244/110 B |
| 4,501,393 | A | * | 2/1985 | Klees et al. ............ 239/265.13 |
| 4,922,713 | A | * | 5/1990 | Barbarin et al. ........... 60/226.2 |
| 4,976,466 | A | * | 12/1990 | Vauchel ................. 239/265.29 |
| 5,228,641 | A | * | 7/1993 | Remlaoui ............... 244/110 B |
| 5,313,788 | A | * | 5/1994 | Wright et al. .............. 60/226.2 |
| 5,448,884 | A | * | 9/1995 | Repp ........................... 60/223 |
| 5,778,659 | A | * | 7/1998 | Duesler et al. ............ 60/226.1 |
| 6,042,053 | A | * | 3/2000 | Sternberger et al. .... 244/110 B |
| 6,170,253 | B1 | * | 1/2001 | Newton ...................... 60/226.2 |
| 6,286,784 | B1 | * | 9/2001 | Hardy et al. ............ 244/110 B |
| 6,385,964 | B1 | * | 5/2002 | Jean et al. ................. 60/226.2 |
| 6,554,224 | B1 | * | 4/2003 | Sternberger ............. 244/110 B |

(Continued)

Primary Examiner—William H. Rodriguez
(74) Attorney, Agent, or Firm—Oliff & Berridge

(57) ABSTRACT

The invention provides a locking system on a cascade thrust reverser for a bypass turbojet, the reverser (20) comprising guide means (60) for the movable parts (50), and the guide means (60) comprising rails (64) attached to the movable parts (50) and tracks (62) attached to the longitudinal members (36).

According to the invention, the locking system (80) comprises locks (82) located at the end (62*a*) of each track (62) in the opening direction (52), each lock comprising a bolt (110) capable of preventing the rail (64) moving in the opening direction (52).

14 Claims, 4 Drawing Sheets

U.S. PATENT DOCUMENTS

| | | | |
|---|---|---|---|
| 6,557,799 B1 * | 5/2003 | Sternberger | 244/110 B |
| 6,584,763 B1 * | 7/2003 | Lymons et al. | 60/226.2 |
| 6,684,623 B1 * | 2/2004 | Langston et al. | 60/226.2 |
| 6,688,098 B1 * | 2/2004 | Rouyer et al. | 60/226.2 |
| 6,786,039 B1 * | 9/2004 | Chakkera et al. | 60/226.2 |
| 6,824,101 B1 * | 11/2004 | Sternberger et al. | 244/110 B |

* cited by examiner

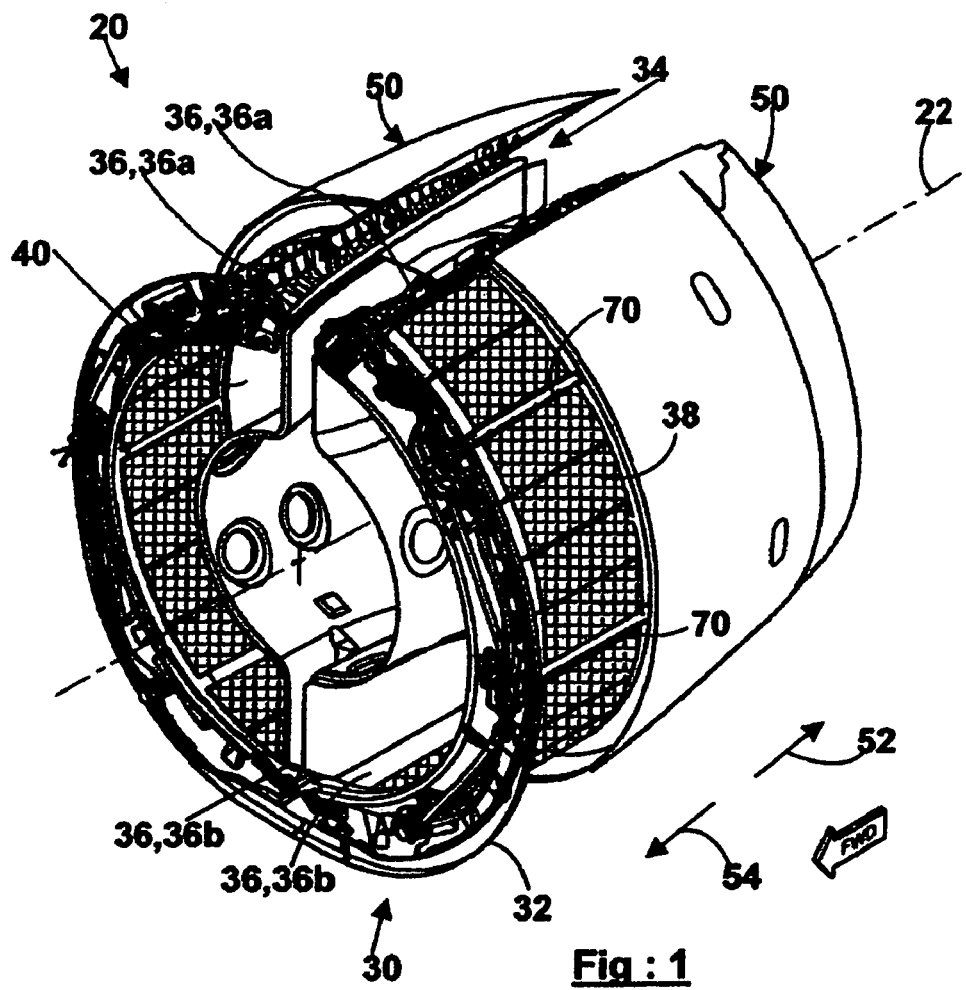
Fig : 1
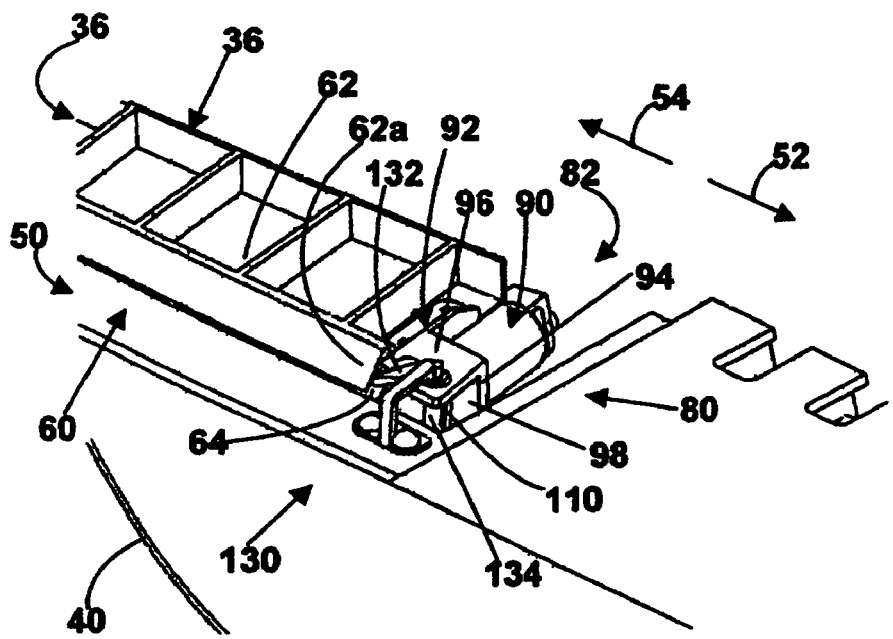
Fig : 2

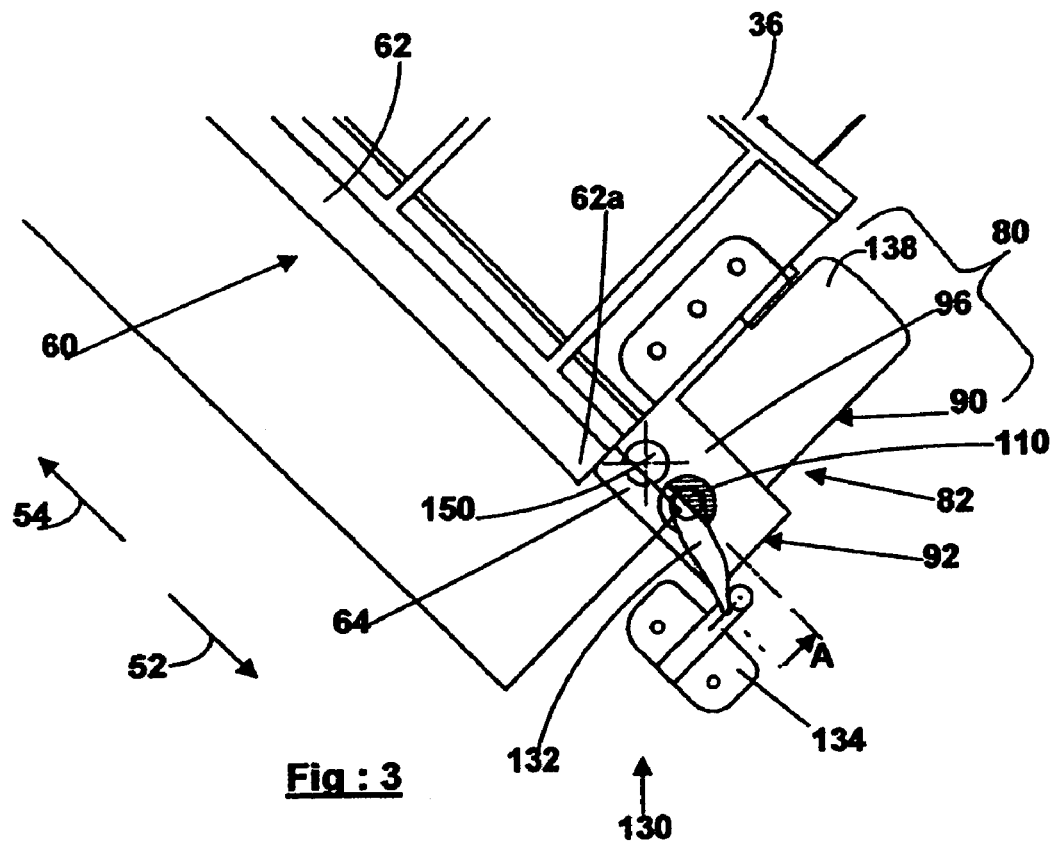
Fig : 3
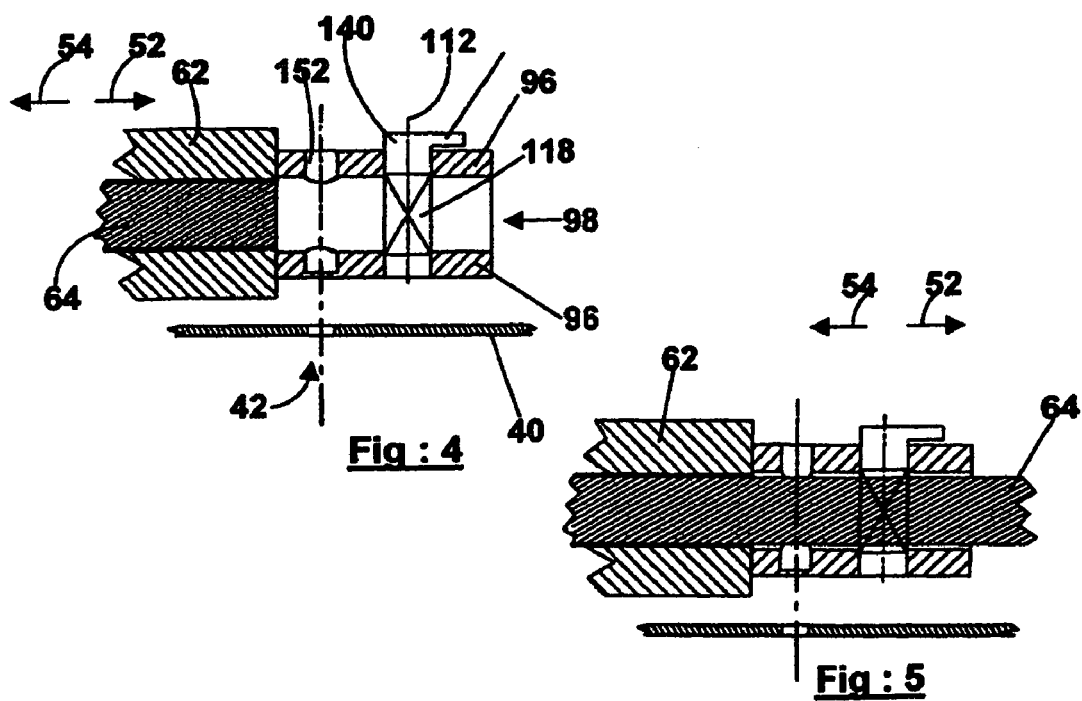
Fig : 4
Fig : 5

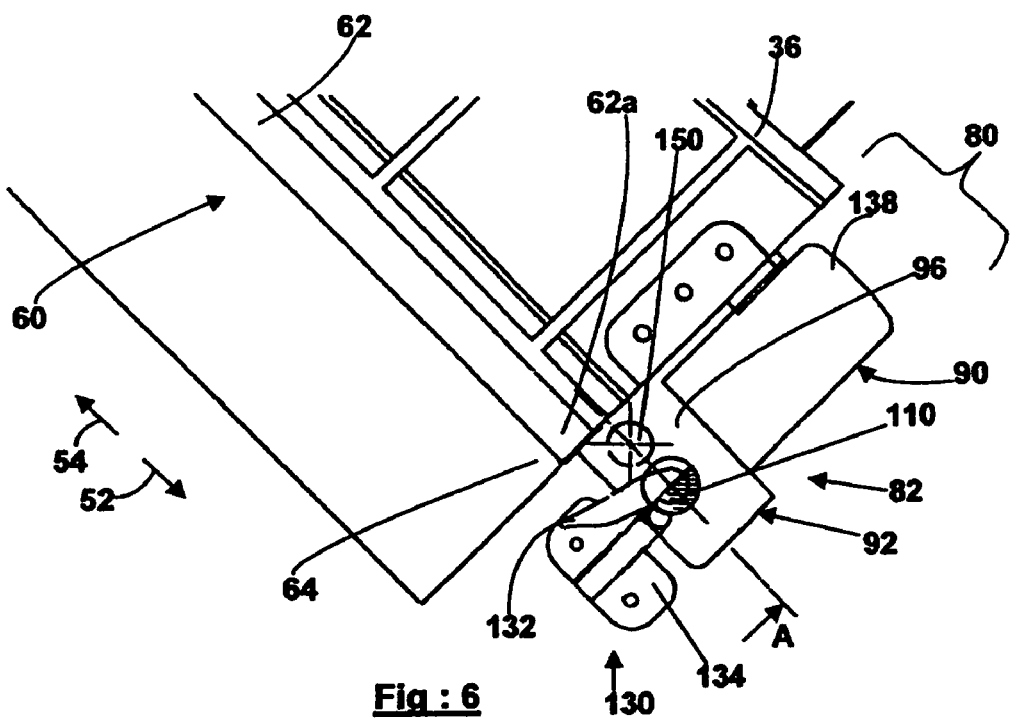
Fig : 6
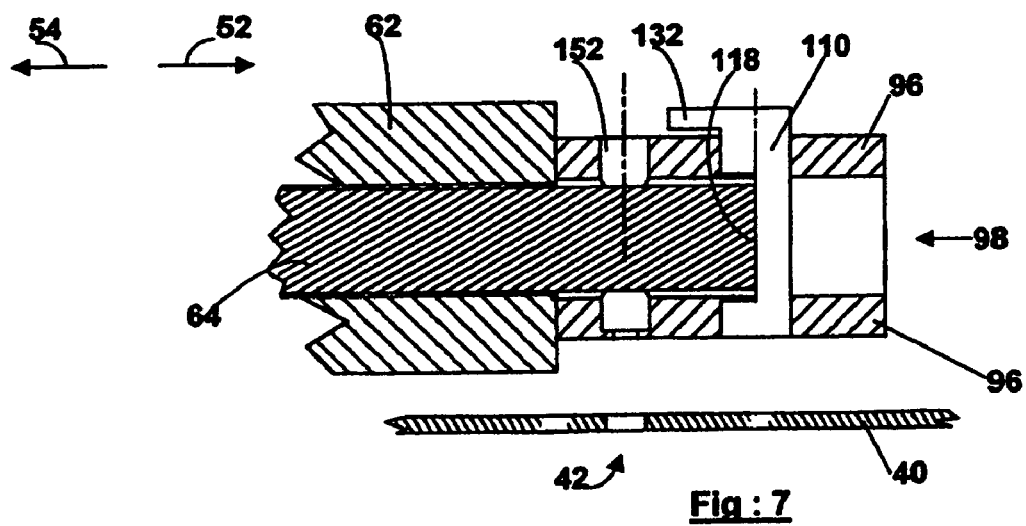
Fig : 7

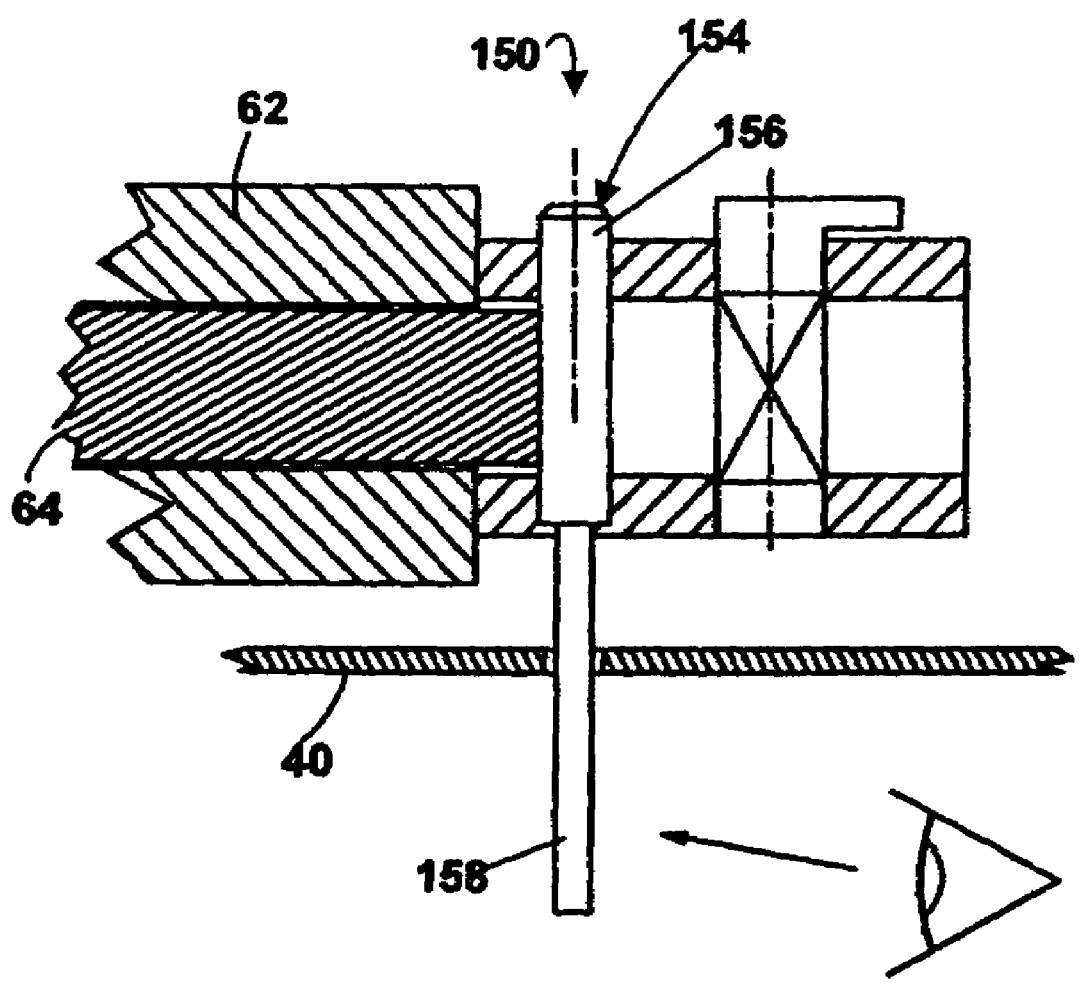
Fig : 8

LOCKING SYSTEM ON A CASCADE THRUST REVERSER

The invention relates to thrust reversers of the cascade type surrounding the bypass turbojets of airplanes, its reversers comprising a fixed part and a movable part, and more specifically to a locking system for immobilizing the movable part on the fixed part.

Thrust reversers are familiar devices that allow the flow of propulsion gases produced by the bypass turbojet to be temporarily deflected forward. The reverser is in the general form of a body of revolution surrounding the turbojet and is basically concentric with it. The reverser has a fixed part and at least one movable part. Schematically, the fixed part consists of a front frame and a rear frame, both annular in shape and connected by a plurality of longitudinal members in the manner of a squirrel cage. The front frame, the rear frame and the longitudinal members are rigid and lightweight hollow structures which give the reverser its stiffness. The whole is surrounded by an external cowling and an internal cowling. Between the longitudinal members are radial holes equipped with a plurality of small vanes which together form cascades, these vanes being capable of deflecting the cold flow of the bypass turbojet in the forward direction. The movable part translates forward or backward to either cover or expose the radial openings. The movable parts are guided during their translation by rails sliding in parallel tracks, the tracks being attached to the longitudinal members. The movable parts are controlled by rams which are usually attached to the front frame.

The movable parts are held in the closed position by so-called "main" locks. These locks are usually situated on the front frame and catch the front ends of the movable parts. The main locks can become inoperative following rupture of a rotor or vane of the turbojet causing debris to be thrown around the turbojet. Debris impacting the reverser can deform the reverser and/or damage the locks. The danger then is that the movable parts may move into the open position, causing accidental and catastrophic thrust reversal while the plane is in flight. To reduce this danger very substantially, secondary locks are fitted at different locations than the main locks, for example on the longitudinal members. But the risk of the reverser being deformed by simultaneous impact on the main locks and secondary locks is not zero. This risk can be prevented by adding still more locks, but then there is a greater risk of a lock failing to open when the airplane pilot engages thrust reversal, in which case the thrust reverser would fail to operate.

The locks are usually of the hook type, that is the bolt is in the form of a hook and retains a roller on the end of a tie rod, the other end of the tie rod being connected to a movable part while the body of the lock is attached to the fixed structure. However, there are drawbacks with such locks:

They are of limited effectiveness in the event of impact, because the roller can come out of the hook if the reverser is deformed, or the hook or the tie rod may break.

These locks are large and become difficult to install if the reverser is very thin, that is if the distance between the inner cowling and the outer cowling is restricted.

At the points where they are attached, these locks generate large torques and extra members have to be inserted to reinforce the fixed structure and movable parts at these points, these extra members having the drawback of increasing the weight and cost of the reverser.

An initial problem to be solved is that of creating a locking system for a cascade thrust reverser, where the system must be insensitive both to impact and to the accidental deformations of the reverser which may arise from such impact.

A second problem to be solved is that of making the locking system small so that it can be fitted between the walls of very thin reversers.

A third problem to be solved is that of creating a locking system for a cascade thrust reverser that does not generate torque at the locations where they are attached to the reverser.

To solve the first problem, the invention provides a locking system on a cascade thrust reverser for a bypass turbojet, the reverser comprising a fixed part which in turn comprises a plurality of radial openings separated by longitudinal members, the radial openings being closed by movable parts moving in the closing direction, the radial openings being exposed when the movable parts move in the opening direction, the reverser comprising guide means for the movable parts, the guide means comprising rails attached to the movable parts and parallel tracks attached to the longitudinal members, and the rails sliding in the tracks, with preferably one degree of freedom in translation, the tracks thus forming elements of the fixed part and the rails elements of the movable parts.

Such a system is noteworthy in that it comprises locks attached to the fixed part in the vicinity of the end of each track in the opening direction, each lock comprising a bolt positioned in line with the corresponding track, the bolt being movable between a locked position and an open position, the bolt in the locked position preventing the rail moving in the opening direction when the rail is retracted in the track, and the bolt in the open position not preventing the rail from moving in the opening direction.

With such an arrangement, the end of the track and the lock move in the space in essentially the same manner when the fixed part deforms because the lock is in the vicinity of the end of the track. The bolt therefore remains substantially in line with the track in the vicinity of its end, and no movement of the movable part in the opening direction is possible as long as the bolt is in the closed position. This solves the first problem.

When it is in the closed position, the bolt has the effect of imprisoning the rail in the track, these two parts being inherently mechanically strong, which makes the locking system relatively insensitive to impact and solves the second problem. Notice that this imprisoning of the rail in the track also has the advantage that the movable parts are restrained even in the event of major damage.

The third problem is solved by the fact that:

the lock generates only very limited torque at the point where it is attached to the fixed structure, because it is close to the end of the track, the lock generates no torque on the rail, because it is in line with the track and therefore with the rail.

A clearer understanding of the invention and its advantages will be gained from a perusal of the following detailed description and of the appended figures.

FIG. 1 illustrates the general structure of a cascade thrust reverser, with the movable parts in the open position.

FIG. 2 illustrates in perspective an example of a locking system according to the invention.

FIG. 3 illustrates the same locking system in plan view, with the lock in the open position.

FIG. 4 shows by a local section on A the disposition of the rail retracted inside the track, the bolt being in the open position.

FIG. 5 shows by a local section on A the disposition of the rail coming out of the track, the bolt being again in the open position.

FIG. 6 illustrates by a plan view the same example but with the lock in the closed position.

FIG. 7 shows by a view in local section the rail locked in the track.

FIG. 8 illustrates by this same view in section an inhibiting device that prevents voluntary or involuntary opening of the reverser.

Referring initially to FIG. 1, the thrust reverser 20 is essentially in the form of a body of revolution about the axis 22 and surrounds a turbojet (not shown) of the "bypass" type, which is likewise centered on the axis 22.

The reverser 20 is of the well-known cascade type. It comprises a fixed structure 30 consisting of a front frame 32 and a rear frame indicated by the reference 34 but not visible in FIG. 1, the front frame 32 and the rear frame 34 being connected together by longitudinal members 36 that are essentially parallel to the axis 22. The front frame 32 and the rear frame 34 are each in the shape of a ring centered on the axis 22. The longitudinal members 36 have their front ends attached to the front frame 32 and their rear ends attached to the rear frame 34. Together, the frames and longitudinal members form a squirrel cage supporting two cowlings 40. The first cowling 40 is on the inside toward the axis 22 and guides the flow generated by the turbojet. The second cowling, which cannot be seen in FIG. 1 because it is covered by the movable parts 50 described later, is on the outside and guides the air flowing on the outside of the reverser. FIG. 1 illustrates one type of reverser 20 that has only two longitudinal members 36 that are on diametrically opposite sides with respect to the axis 22: the first longitudinal member 36a, known as the "12 o'clock member" is toward the pylon of the airplane, i.e. usually above the reverser 20, and the second longitudinal member 36b referred to as the "6 o'clock member" is diametrically opposite the first with respect to the axis 22, i.e. usually at the bottom of the reverser. Notice that certain types of reverser do not have a rear frame 34, but this does not affect the invention. Also notice that FIG. 1 illustrates a reverser 20 divided into two half-shells assembled around the turbojet, the "12 o'clock" longitudinal member 36a and the "6 o'clock" longitudinal member 36b themselves therefore being divided into two in the length direction, but again this has no consequences on the invention.

The fixed structure 30 thus comprises radial openings 38 that are each delimited in the forward direction by the front frame 32, in the rearward direction by the rear frame 34 and separated from each other by the longitudinal members 36.

For obvious reasons of stiffness and low weight, the components of the fixed structure 30 are hollow and made up of thin walls, such as sheet metal or a composite material based on fiber or textile-reinforced thermosetting resin. Such a fixed structure 30 is however still capable of being deformed under the impact of debris resulting from a vane or rotor of the turbojet braking.

Turning now to FIGS. 1 and 2, the reverser 20 also comprises movable parts 50 capable of covering the radial openings 38 by translating forward in the closing direction 54, or uncovering them by an opposing rearward translation in the opening direction 52, these translations taking place usually but not necessarily parallel to the axis 22. Notice that in this example, which represents a common type of reverser, the opening direction 52 corresponds to a rearward or downstream movement of the reverser, while the closing direction 53 corresponds to a forward or upstream movement of the reverser. The reverser also has guide means 60 consisting of rails 64 sliding in parallel tracks 62, the tracks 62 being parallel to the axis 22 and attached to the longitudinal members 36, for example on their flanks, and the rails 64 themselves being attached to the movable parts 50. The reverser 20 also comprises control means 70, usually in the form of screw actuators, attached to the front frame 32 and parallel to the tracks 62: these actuators move the movable parts 50 in the opening 52 and closing 54 directions. Notice that the tracks 62 and the rails 64 are mechanical parts, sliding one inside the other with not much clearance. Thus, unlike the fixed structure 30, the tracks 62 and the rails 64 are more solid parts and less liable to deform. The tracks 62 and the rails 64 are usually of dovetail design.

When the movable parts 50 are covering the openings 38, they are held in this "closed" position, as it is called, by locks attached to the fixed structure 30. Usually, each movable part 50 is held by its front end by a "main" lock attached to the front frame 32. The main lock may however become inoperative in the event of deformation of the front frame 32 following an impact. It is therefore usual to fit so-called back-up locks on either side of each movable part 50, attaching them at different locations than the main locks.

Referring now more particularly to FIG. 2, according to the invention the locking system 80 comprises locks 82 situated at the rear end 62a of each track 62 in the opening direction 52, with each lock having a bolt 110 positioned in line with the corresponding track 62, and the bolt 110 and therefore the lock 82 being in the vicinity of this rear end 62a. The bolt 110 can be moved between a locked position and an open position. When the rail 64 is retracted into the track 62, the bolt 110 in the locked position prevents the rail 64 moving in the opening direction 52, so that the bolt 110 keeps the rail 64 imprisoned in the track 62. In the open position, the bolt 110 no longer prevents such motion and the rail 64 can thus move in the opening direction 52. This locking system is therefore relatively insensitive to deformations of the fixed structure 30, even if these deformations are severe and affect the ends 62a of the tracks 62, because:

1. the bolt 110 remains lined up with the track 62 and thus continues to perform its function, and
2. the rail 64 is still imprisoned in the track 62: this keeps the movable part 50 in its closed position over the corresponding radial opening 38.

The lock 82 can be attached to the longitudinal member 36. It can also be attached, or indeed built in, directly to the end 62a of the track 62, thereby further reducing the risk of a relative movement occurring between the bolt 110 and the track 62. The important point is that the path along which the load would be transferred between the end 62a of the track and the point of attachment of the lock to the fixed structure must be short.

In a first embodiment of the invention, the locks 82 are the main locks.

However, in a preferred embodiment of the invention, the locks 82 are back-up locks, the reverser having independent main locks, and possibly secondary locks, based on known technology.

FIGS. 2 to 5 will now be considered. In this example, the locking system 80 is used as a back-up. The locking system 80 comprises a lock 82 which in turn comprises a body 90 attached to the longitudinal beam 36 in the vicinity of the end 62a of the track. The body 90 in turn comprises at one end a U-shaped yoke 92, and this yoke 92 in turn comprises a base 94 by which it is attached to the rest of the body 90 and two parallel wings 96 attached by one end to the base 94. The base 94 and the two wings 96 define an open space 98 which lies in the continuation of the track 62 and is therefore in the path of the rail 64. Consequently the rail 64 passes between the two wings 96 when it moves in the opening direction 52. The lock 82 also comprises a bolt 110 that moves between a "closed" position and an "open" position. When in the closed position, this bolt 110 prevents the rail 64 moving in the opening direction 52, i.e. the rail 84 stops against the bolt 110 when it is in the track 62 and moving in the opening direction 52. When the bolt 110 is in the open position, however, it does not prevent the rail 64 moving in the opening direction. The example illustrated in the figures shows a cylindrical bolt 110 mounted so as to pivot, about an axis 112, in the wings 96, extending through the open space 98 between the two wings 96. One part of the bolt 110, situated between the wings 96, is in line with the track 62 and therefore in the path of the rail 64. The bolt 110 is therefore able to block the rail 64 when the latter is moving in the opening direction 52, as the end of the rail 64 situated in the opening direction 52 stops against the bolt 110. The bolt 110 has a notch 118 that allows the rail 64 to pass when the bolt is in the open position. When the bolt 110 is in the open position, the notch 118 is lined up with the track 62 and the rail 64 can then move in the opening direction 52, passing through the notch 118 without interfering with the bolt 110. When the bolt 110 has pivoted approximately 90° and reached the closed position, the notch 118 is no longer lined up with the track 62. The bolt 110 now prevents the rail 64 moving in the opening direction 52, so the rail 64 is imprisoned in the track 62.

The locking system 80 also comprises bolt 110 control means 130. These control means comprise firstly a lever 132 and an actuator 134. The lever 132 is perpendicular to the bolt 110 and attached to it preferably, but not necessarily, on the outside of the U yoke 92. The actuator 134 is attached to the movable part 50 and preferably to the rail 64 of the movable part 50. The actuator 134 is positioned so as to apply a force to the lever 132 when the rail 64 moves in the closing direction 54 and reaches the end of its travel inside the track 62, this force causing the bolt 110 to pivot to the closed position. The control means 130 also include a spring (not shown), such as a spiral spring, which applies a torque to the bolt 110 such as to pivot it automatically into the open position. Lastly, the control means 130 comprise a catch (also not shown because hidden inside the body of the lock) that is itself controlled by a motor 138, the catch keeping the bolt 110 automatically in the closed position despite the torque applied by the spring. In response to a signal the motor 138 allows the catch to be disengaged in order to free the bolt 110 and allow it to pivot into the open position under the action of the spring. The catch is of some ordinary mechanical engineering design. It may take the form of, for example, a pin sliding in the body 90 and pushed by a spring against the bolt 110, so that the pin passes into a hole in the bolt 110 when in the locked position and so prevents the bolt 110 from pivoting, while the motor 138 can pull the pin out of the hole to release the bolt 110. The motor 138 may for example be a linear electric motor with a core that passes into a solenoid, the moving core being connected to the rod or forming one end of this rod.

The movable parts of the reverser can thus be opened in the following manner:

A pulse is sent to the motors 138 to release the catches and allow the springs to apply to the bolts 110 a torque capable of pivoting them to the open position, complete pivoting not however being able to occur at this level because the levers 132 stop against the actuators 134.

The movable parts 50, and by repercussion the actuators 134, translate in the opening direction 52, freeing the levers 132 and allowing the springs to pivot the bolts 110 into the open position. In this position the notches 118 are now lined up with the tracks 62, allowing continued translation of the movable parts 50 toward the rear 26 until the radial openings 38 are completely free, as the rails 64 pass through the corresponding notches 118.

The movable parts of the reverser can be closed in the following manner:

The movable parts 50, and by repercussion the actuators 134, translate in the closing direction 54, the rails 64 retracting fully into the tracks 62 and the movable parts 50 covering the openings 38.

When the rails 64 reach the end of their travel and are no longer in the notches 118, the actuators 134 push the levers 132 and cause the bolts 110 to rotate into the locked position as a result of the translation in the closing direction 54 of the movable parts 50 and of the associated actuators 134.

When the bolts reach the locked position, the catches 138 engage automatically under the pressure of the springs, and the catches then keep the bolts 110 automatically in this locked position.

It will be understood that the lock 82 may be in a "solid" form and be located in a small space at the end of a track 62. This achieves two advantages for the invention:

It can be used on thin reversers, i.e. having little thickness.

The lock 82 can keep the rail 64 in the track 62 with a very large force without generating large torques on the other parts of the fixed structure. It can thus be held in position on this fixed structure 30 simply by means of a lightweight component.

Another advantage of the invention is that the rail abuts endwise against the bolt, so there is no torque on the rail.

Referring now to FIGS. 6, 7 and 8, if the airplane has to take off again but a reverser is defective and it has not been possible to repair it, it is vital to neutralize this reverser visibly, and its movable parts must remain in the closed position in a manner that can be relied upon. For this purpose the invention also provides an inhibiting device 150 built into the locking system. This inhibiting device 150 comprises in the U yoke 92 a bore 152 able to accommodate and retain an inhibiting rod 154, this bore 152 being positioned in such a way that the inhibiting rod 154, where present, prevents the rail 64 moving in the opening direction 52. The inhibiting rod 154 can be simply fitted by hand by the maintenance worker. Retention of the inhibiting rod 154 in the bore 152 can be by any means. The inhibiting rod 154 is continued by a tail 156 of sufficient length to be able to pass through a hole 42 in the cowling 40 and thus be visible from the outside, as shown in FIG. 8. In the example shown in FIG. 8, the tail 158 has a smaller diameter than the body 156 so as to form a shoulder which moves under gravity into contact with another shoulder formed in the bore 152. During the preflight inspection of the airplane, this tail 156 provides a visual check that reverser 20 operation is inhibited. The bore 152 is preferably, but not necessarily, located between the bolt 110 and the end 64a of the rail 64 when the latter is at the end of its travel in the closing direction 54. It is thus possible to lock the movable parts 50 in a position very close to the closed position.

What is claimed is:

1. A locking system on a cascade thrust reverser for a bypass turbojet, the reverser comprising a plurality of radial openings separated by one or more longitudinal members, the radial openings being closed by one or more movable parts moving in the closing direction, the radial openings being exposed when the one or more movable parts move in the opening direction, the reverser comprising guide means for the movable parts, the guide means comprising one or more rails attached to the movable parts and one or more tracks attached to a corresponding one of the one or more longitudinal members, and the one or more rails sliding in the one or more tracks, characterized in that the locking system comprises one or more locks located at an end of each of the one or more tracks in the opening direction, each lock comprising a bolt positioned in line with a corresponding track of the one or more tracks, the bolt being movable between a locked position and an open position, the bolt in the locked position preventing a corresponding rail of the one or more rails from moving in the opening direction when the corresponding rail is retracted into the corresponding track, and the bolt in the open position not preventing the corresponding rail from moving in the opening direction.

2. The locking system as claimed in claim 1, characterized in that one of the one or more locks is attached to one of the longitudinal members.

3. The locking system as claimed in claim 1, characterized in that one of the one or more locks is attached to the end of one of the one or more tracks.

4. The locking system as claimed in claim 1, characterized in that the one or more locks are the main locks.

5. The locking system as claimed in claim 1, characterized in that the one or more locks are back-up locks.

6. The locking system as claimed in claim 5, characterized in that each of the one or more locks comprises a body attached to a corresponding longitudinal member, the body comprising a U-shaped yoke supporting a cylindrical pivoting bolt, that part of the bolt which is situated between the wings being in line with a corresponding track and comprising a notch, said notch being in line with the corresponding track when the bolt is in the open position, said notch then allowing a corresponding rail to pass as it moves along the corresponding track, and the locking system also comprising control means for operating the bolt between the locked position and the open position.

7. The locking system as claimed in claim 6, characterized in that the control means comprise an actuator attached to the assembly formed by the one or more movable parts and the one or more rails, a lever attached to the bolt, a spring applying to the bolt a torque capable of pivoting it into the open position, a catch that automatically immobilizes the bolt when in the locked position and a motor for releasing the catch in response to a signal, and the actuator applying a force to the lever when the rail moves in the closing direction and reaches the end of its travel in the track, this force having the effect of pivoting the bolt into the closed position.

8. The locking system as claimed in claim 6, characterized in that the locking system comprises a bore and an inhibiting rod, this bore being located in the U-shaped yoke, the bore being positioned in such a way that the inhibiting rod, when present in the bore, prevents the rail moving in the opening direction.

9. The locking system as claimed in claim 8, the inhibiting rod being present in the bore, characterized in that the inhibiting rod is continued by a tail of sufficient length to be able to pass through a hole in the cowling and thus be visible on the outside.

10. The locking system as claimed in claim 2, characterized in that the locks are the main locks.

11. The locking system as claimed in claim 3, characterized in that the locks are the main locks.

12. The locking system as claimed in claim 2, characterized in that the locks are back-up locks.

13. The locking system as claimed in claim 3, characterized in that the locks are back-up locks.

14. The locking system as claimed in claim 7, characterized in that the locking system comprises a bore and an inhibiting rod, this bore being located in the U-shaped yoke, the bore being positioned in such a way that the inhibiting rod, when present in the bore, prevents the rail moving in the opening direction.

* * * * *